No. 738,188. PATENTED SEPT. 8, 1903.
G. E. HATCH.
SECONDARY BATTERY.
APPLICATION FILED FEB. 13, 1899.
NO MODEL.
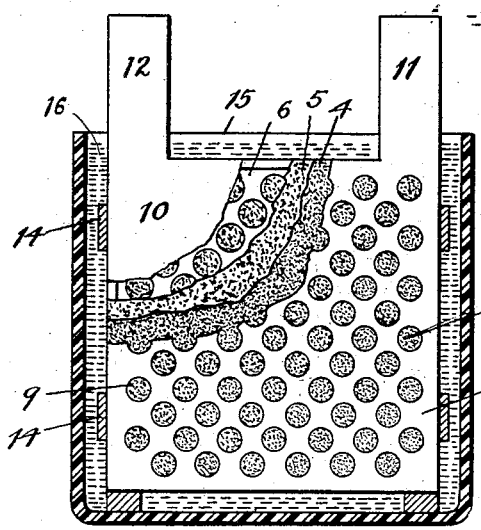
Fig. 1.
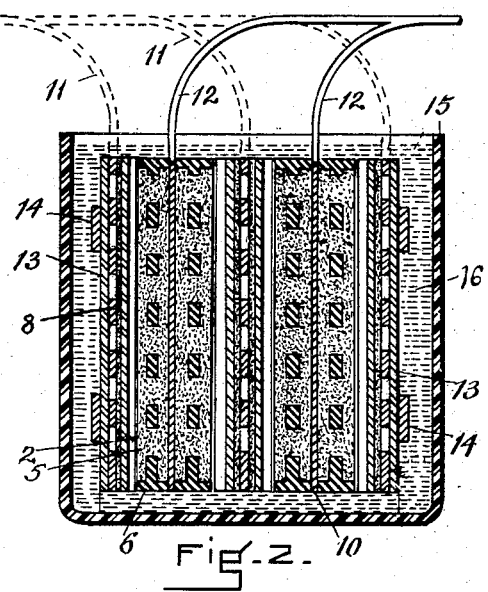
Fig. 2.
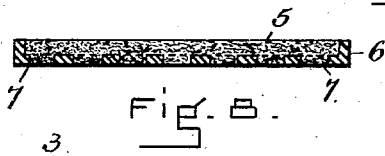
Fig. 8.
Fig. 3.
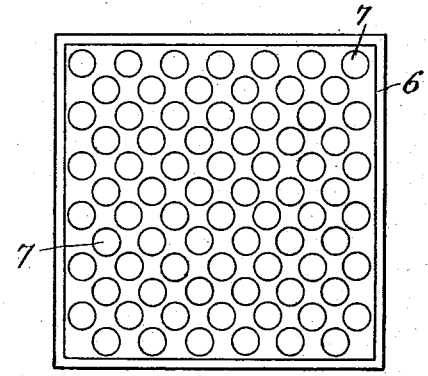
Fig. 4.
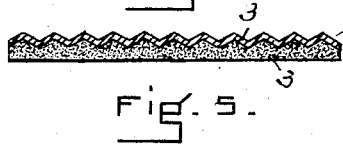
Fig. 5.
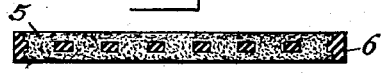
Fig. 6.
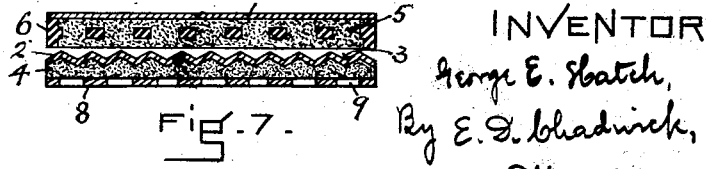
Fig. 7.
WITNESSES
Frank G. Parker
Frank G. Hattie
INVENTOR
George E. Hatch,
By E. D. Chadwick,
Attorney.

No. 738,188. Patented September 8, 1903.

UNITED STATES PATENT OFFICE.

GEORGE E. HATCH, OF QUINCY, MASSACHUSETTS, ASSIGNOR, BY MESNE ASSIGNMENTS, TO THE HATCH ACCUMULATOR COMPANY, OF KITTERY, MAINE, AND BOSTON, MASSACHUSETTS, A CORPORATION OF MAINE.

SECONDARY BATTERY.

SPECIFICATION forming part of Letters Patent No. 738,188, dated September 8, 1903.

Application filed February 13, 1899. Serial No. 705,387. (No model.)

*To all whom it may concern:*

Be it known that I, GEORGE E. HATCH, a citizen of the United States, residing at Quincy, in the county of Norfolk and State of Massachusetts, have invented certain new and useful Improvements in Secondary Batteries, of which the following is a specification.

My invention relates to secondary batteries or electrical accumulators, and more particularly to batteries of that type in which porous supports are used for carrying or confining the active material in whole or in part, my invention being intended to produce a durable and efficient secondary battery of the type referred to.

My invention is illustrated in the accompanying drawings, in which—

Figure 1 is a sectional view through a cell parallel to the electrodes with certain parts broken away. Fig. 2 is a central vertical section through a cell at right angles to the plane of Fig. 1. Fig. 3 is a face view of a rigid porous support-plate. Fig. 4 is a face view of a support used in the construction of a negative-pole electrode. Fig. 5 is a transverse section through a porous support-plate loaded with active material or material adapted to become active. Fig. 6 is a transverse section through the device shown in Fig. 4 combined with active material or material adapted to become active. Fig. 7 is a transverse section through a complete couple composed of the parts shown in Figs. 5 and 6 assembled together in combination with their respective conducting-plates. Fig. 8 is a transverse section through a slightly-modified form of support of the type shown in Fig. 4 combined with active material.

In the drawings each of the positive-pole electrodes of my battery is shown as composed of a rigid porous support-plate 2, which is best made of kaolin or similar acid-resisting material containing no iron and is preferably corrugated in one direction, so as to provide a number of parallel grooves 3, which are filled on one side of the plate with active material 4 or material adapted to become active when the battery is charged. Red lead is commonly used for the purpose and may be applied to the plate in the form of a paste in a manner well known in the art.

In constructing the negative-pole electrodes of my battery I employ thin porous plates 6, preferably made of light porous wood, each plate having the form of a shallow tray on one side, as shown in Fig. 8, or on both sides, as shown in Fig. 6, and being provided with a profusion of holes 7 piercing its bottom. The red lead or equivalent material 5 is filled into the holes 7 and into the tray or trays until it is level or slightly more than level with the edges thereof. These trays serve to support and give form to the masses of material 5 during the process of formation of the cell; but inasmuch as said masses are reduced by the forming process to the condition of firm, coherent, and durable masses of porous or spongy metallic lead, which are capable of supporting their own weight without crumbling, the trays 6 need not be as heavy and rigid as the support-plates 2, but may be made very thin and light and of a variety of materials, such as wood, plaster-of-paris, asbestos cloth, and the like.

The conducting-plates of my battery are made from thin sheets of suitable material, such as metallic lead, and are cut out to correspond in size with the adjacent parts of the cell, an upwardly-projecting strip being left on each of them to serve as a means of connection with the other plates of like polarity. I have shown the conducting-plates 8 as provided with a number of pockets or perforations 9, which in use become filled with the electrolyte and are designed to serve as reservoirs thereof ready to supply the same to the adjacent active material when needed, as in the case of an excessively high rate of discharge. These perforations may be omitted, however, without affecting my present invention.

In assembling the parts above described a loaded support-plate 2 is placed against one of the conducting-plates 8, with the material 4 in contact therewith and preferably with the grooves 3 vertical in order to allow a free passage upward for the escape of the gases generated by the action of the cell. One of the loaded trays 6 is then placed against the support-plate 2, and a conducting-plate 10 is then placed against the opposite face of said tray 6, so as to be in contact with the material 5 over its entire surface. The parts just described when assembled form one complete couple, and as many of them as desired may be combined in one cell in a well-known manner, with the positive and negative conducting-plates alternating with one another, in which case each plate except the two outer ones serves as such for two like masses of active material. The connecting-strips 11 on the plates 8 are located on one side of the cell and joined together to form one terminal thereof, and the corresponding strips 12 on the plates 10 are located on the opposite side of the cell and similarly joined together to form the other terminal. The couples may be held together by means of backs 13, of glass, slate, paraffined wood, or equivalent acid-proof material, placed against the opposite faces of the combined element and held thereto by rubber bands 14, passing around the element. When the elements are large, the bands 14 may be made of lead and provided with small rubber buffers beneath them. The structure is thus made integral and permanent in form, while at the same time it is capable of sufficient expansion and contraction to satisfy the conditions of use. The element is of course suitably supported in a receptacle 15, containing the usual electrolyte 16, and any desired number of such cells may be combined in the usual manner.

It will be seen that in my battery the mass of active material of each negative-pole electrode is supported on a sort of framework, which not only keeps said material in proper relation to the adjacent parts of the cell during the forming process and adds strength to the electrode when formed, but also provides for the direct exposure of the outer face of the mass of material to the action of the electrolyte, while by reason of the perforation of these supporting-frameworks and the porosity of the material of which they are made the permeation of the electrolyte through the active material is freely permitted. The rigid porous support-plates 2 serve to insulate the adjacent electrodes from each other and also afford lateral support to the negative-pole electrodes and give rigidity to the element as a whole, while the grooves in the outer faces of these support-plates provide for a free circulation of the electrolyte and ready access thereof to the negative-pole electrodes and also for the escape of the gases generated at said electrodes, which pass directly from the same into said grooves and thence upward out of the cell.

I do not claim herein broadly a secondary battery in which a positive-pole electrode comprising a porous non-conducting support is combined with a negative-pole electrode laterally supported by said porous support and having its chemically-active surface directly exposed to the action of the electrolyte in spaces provided between said surface and support, as such construction is claimed in another application for Letters Patent filed by me on the 14th day of July, 1899, Serial No. 723,753, which application is to be regarded as a division of and substitute for this present application so far as it includes patentable subject-matter herein shown and described, but not claimed. My present invention relates to the construction herein described of the negative-pole electrodes, and it will be evident that said electrodes may be combined with positive-pole electrodes of any desired construction, so long as provision is made for insulating adjacent electrodes from each other and for giving proper lateral support to the negative-pole electrodes.

I claim as my invention—

1. In a secondary battery, an electrode comprising a conducting-plate in combination with a perforated porous support and a continuous layer of active material applied to one face of said support and confined between it and said conducting-plate, in contact with the latter, substantially as described.

2. In a secondary battery, an electrode comprising a conducting-plate, each face of which is held in contact with a porous support provided with perforations and loaded with active material, said active material being spread over the entire surface of said support between the latter and said plate, substantially as described.

3. In a secondary battery, the combination with a positive-pole electrode having as one of its elements a rigid, porous support-plate, of a negative-pole electrode comprising a conducting-plate and a perforated porous tray filled with active material and confined between said support-plate and conducting-plate, the active material being spread over the entire inner face of the tray and held in contact with the conducting-plate, substantially as described.

In testimony whereof I have hereunto subscribed my name this 11th day of January, 1899.

GEORGE E. HATCH.

Witnesses:
E. D. CHADWICK,
W. E. ELLIS.